United States Patent [19]

Chung et al.

[11] Patent Number: 5,280,087

[45] Date of Patent: Jan. 18, 1994

[54] PREPARATION OF BLOCK COPOLYETHER-ESTER-AMIDES

[75] Inventors: Lie-Zen Chung, Hsinchu; De-Lun Kou, Taichung; Wen-Bin Shiu, Miaoli; Fu-Le Lin, Taipei, all of Taiwan

[73] Assignee: Industrial Technology Research Institute, Hsinchu, Taiwan

[21] Appl. No.: 7,822

[22] Filed: Jan. 22, 1993

Related U.S. Application Data

[63] Continuation of Ser. No. 612,911, Nov. 14, 1990, abandoned.

[51] Int. Cl.$^5$ .................. C08G 63/04; C08G 65/32
[52] U.S. Cl. ................... 525/403; 525/425; 525/434
[58] Field of Search ............... 525/425, 434, 403

[56] References Cited

U.S. PATENT DOCUMENTS

| | | | |
|---|---|---|---|
| 4,309,518 | 1/1982 | Horlbeck et al. | 525/425 |
| 4,459,389 | 7/1984 | Mumcu et al. | 525/408 |
| 4,536,563 | 8/1985 | Okitsu et al. | 528/279 |
| 4,874,825 | 10/1989 | Gergen et al. | 525/425 |

*Primary Examiner*—Ana L. Carrillo
*Attorney, Agent, or Firm*—Cushman, Darby & Cushman

[57] ABSTRACT

Disclosed is a novel two-step reaction method for preparing block copolyether-ester-amides. In the first step, caprolactam or other lactam is reacted with a polyether polyol in the presence of a catalyst to form an amino-terminated prepolymer with both a polyamide hard segment and a polyether soft segment. In the second step, the prepolymer is reacted with a dicarboxylic acid as a chain extender to form high molecular weight block copolyether-ester-amides.

The block copolyether-ester-amides prepared by this method are transparent, easily moldable by conventional processing methods such as extrusion and injection molding, and exhibit excellent mechanical properties.

17 Claims, No Drawings

PREPARATION OF BLOCK COPOLYETHER-ESTER-AMIDES

This is a continuation of application Ser. No. 07/612,911, filed on Nov. 14, 1990, now abandoned.

BACKGROUND OF THE INVENTION

1. Field of the Invention

The present invention relates to a method preparing block copolyether-ester-amides. In the first step, polyether polyol is reacted with caprolactam or other lactam in the presence of a catalyst to form an amino group-terminated prepolymer. The prepolymer is then reacted with a dicarboxylic acid to produce high molecular weight block copolymers.

2. Description of the Related Art

Methods of synthesizing block copolyether-ester-amides have been disclosed in various patents. French Pat. Nos. 1,444,437 and 2,178,205 disclose methods which comprise reacting a dicarboxyl-end polyamide with a polyoxyalkylene glycol to produce block copolymers used as anti-static agents. The molecular weight of block copolymers prepared by these methods, however, is rather low.

U.S. Pat. No. 4,332,920 (ATO Chimie, France) discloses a method which comprises reacting a dicarboxyl-end polyamide with a poly(tetramethylene ether) glycol (PTMEG) in the presence of a tetraalkylorthotitanate catalyst. The carboxy-end polyamide used in this method can be a polyamide with a carboxylic acid end group obtained from lactams or amino acids having 4–14 carbon atoms, or a condensation product of a dicarboxylic acid and a diamine, such as low molecular weight nylon-6,6, nylon-6,9, nylon-6,12, or nylon-9,6. The products exhibit good mechanical properties and can be processed by conventional machinery.

Japan Pat. No. 57-24808 discloses a single-step synthesis method. An amino acid having more than 10 carbon atoms, PTMEG, and dicarboxylic acid are copolycondensed in the presence of water to form block copolyether-ester-amides. Japan Pat. No. 58-21095 discloses a similar method in which aminocapric acid is used instead of higher amino acids.

The method disclosed in Japan Pat. 57-24808 involves reaction of an amino acid having more than 10 carbon atoms, PTMEG, and dicarboxylic acid in the presence of water. During the reaction process, carboxylic acid groups are first reacted with an amino group rather than the hydroxy group of PTMEG, due to the higher reactivity of the amino group. Thus, oligomeric polyamides with carboxyl end groups are first formed, and then condensed with PTMEG to form block copolyether-ester-amides. In fact, in the above methods, either one step or two step, a carboxy-end polyamide exists.

When a carboxy-end polyamide derived from caprolactam is used instead of one derived from higher lactams, the miscibility becomes a severe problem. The carboxy-end polyamide derived from caprolactam is immiscible with PTMEG. During the reaction, however, phase separation occurs, and the caprolactam-based block copolyether-ester-amide possesses low molecular weight, is opaque, and exhibits poor mechanical properties.

Japan Pat. No. 61-278530 discloses a method wherein the problem of immiscibility of carboxy-end polycaprolactam and PTMEG is solved by using a compatibilizer. In this method, carboxy-end polycaprolactam is reacted with PTMEG in the presence of at least 70 wt% of caprolactam (base on polyamide segment) which is used as a compatibilizer. The presence of caprolactam renders the reaction mixture homogeneous, and a transparent product is obtained. The use of such a high percentage of caprolactam, however, reduces the conversion.

West German Pat. No. 213,577 discloses another method for preparing nylon-6 based block copolyether-ester-amides. In this method, polyether polyol is first reacted with dicarboxylic acid, and the polyether with carboxyl end group is then reacted with caprolactam. The resultant product, however, is very brittle.

Clearly, the miscibility of carboxy-end polyamide and polyether polyol poses a substantial problem in preparing the block copolyether-ester-amides by the above method. When the reaction mixture is homogeneous, as is the case when carboxy-end polyamide is derived from higher carbon atom raw material such as nylon-11 and nylon-12, or a compatibilizer is present, a good result is observed. Otherwise, the result is a low molecular weight block copolyether-ester-amide with less than desirable properties. The immiscibility problem is particularly severe between carboxy-end polycaprolactam and PTMEG.

SUMMARY OF THE INVENTION

It is an object of this invention to provide a method for preparing high molecular weight block copolyether-ester-amides which exhibit transparency, toughness, and good mechanical properties.

Accordingly, this invention provides a novel two-step reaction method for preparing block copolyether-ester-amides. In the first step, caprolactam or other lactam is reacted with a polyether polyol in the presence of a catalyst to form an amino-terminated prepolymer with both a polyamide hard segment and a polyether soft segment. In the second step, the prepolymer is reacted with a dicarboxylic acid as an extender to form high molecular weight block copolyether-ester-amides.

It is another object of this invention to provide a block copolyether-ester-amide preparation method which avoids the formation of carboxy-end polycaprolactam, which is immiscible with PTMEG.

Accordingly, the present invention provides a method of forming an amino-terminated prepolymer which possesses both a polyether soft segment and a polycaprolactam hard segment. Since the prepolymer is miscible with dicarboxylic acid, phase separation does not occur.

Advantages of the present method include: i) use of a single reactor; ii) minimization of expense associated with caprolactam; iii) high conversion of caprolactam; iv) transparency, toughness, and good mechanical properties of the product; and v) flexibility of the process to accommodate various lactams and polyether polyols as reactants.

DESCRIPTION OF THE PREFERRED EMBODIMENTS

The present invention will be disclosed in terms of the currently perceived preferred embodiments thereof.

A catalyst is utilized in the first step, and may be a single compound or a mixture of several compounds. The amount of catalyst added may range from 0.01 to 5 wt%, and is preferably from 0.05 to 2 wt%. Compounds which may be employed as catalysts include organic acids such as oxalic acid and toluene sulfonic acid, and inorganic acids such as phosphoric acid, sulfuric acid, or a mixture thereof.

The raw materials for producing the hard segments in the first step comprise ring opening polymerizable lactams, including lactams having 4 to 14 carbon atoms, such as caprolactam, undecanolactam, and dodecanolactam. The amount of lactam may range from 15 to 95 wt%, and is preferably from 20 to 85 wt%.

The polyether polyols utilized as raw materials for forming the soft segment in the first step comprise poly(tetramethylene ether) glycol, polypropylene glycol, and polyethylene glycol. The amount of polyol may range from 5 to 85 wt%, and is preferably from 15 to 80 wt%. The molecular weight of the polyols is in the range of from 200 to 6000, and is preferably from 600 to 3500.

In the first step, the reaction temperature may be between 190° C. and 250° C, and is preferably between 210° C. and 240° C. The reaction time can vary from 1 to 4 hours, and is preferably between 1.5 and 2 hours.

An advantageous aspect of the present invention is that the product obtained in the first step need not be discharged from the reactor. Once the first reaction step is completed, the dicarboxylic acid reactant of the second step can be charged directly to the reactor. Thus, only a single reactor is necessary for this novel method.

The chain extender used in the second step may be a dicarboxylic acid or a carboxy-end polyamide oligomer. Suitable dicarboxylic acids which may contain 4 to 20 carbon atoms include aliphatic dicarboxylic acids such as succinic acid, adipic acid, suberic acid, undecanedioic acid, and dodecanedioic acid; cycloaliphatic dicarboxylic acid such as 1,4-cyclohexanedicarboxylic acid; and aromatic dicarboxylic acids such as terephthalic acid, isophthalic acid, o-phthalic anhydride, and 2,6-naphthalene dicarboxylic acid. Suitable backbones of carboxylic polyamide oligomers include nylon-6, nylon-6,6, nylon-6,9, nylon-6,10, nylon-11, nylon-6,12, and nylon-12. The molecular weight of the polyamide oligomers may range from 150 to 1500, and is preferably from 400 to 800.

In the second step, the reaction is held at 240° to 280° C., and 0.1 to 10 mmHg. Preferably the reaction occurs at 250° to 270° C., and 1 to 5 mmHg. The reaction time can be from 2 to 6 hours, and is preferably 3 to 5 hours, depending on the requirements of product.

Additives such as antioxidants may be added during the preparation process. Other additives, however, such as flame retardants, pigments, or other reactive additives must be added after the preparation process.

The present invention is further illustrated by the following examples which are presented as specific illustrations thereof. The invention is not limited, however, to the specific details set forth in the examples.

The products were evaluated according to the following test procedures. The relative viscosity was determined in m-cresol at 30° C. at a concentration of 0.5 g/dliter. The melting point was determined by Differential Scanning Colorimetry (DSC) under nitrogen at a heating rate of 20° C./min. Hardness was measured according to ASTM D2240. The tensile properties were determined according to ASTM D412.

EXAMPLE 1

This Example explains the typical preparation process of the invention. In the first step, 1000 g of PTMEG with a molecular weight of 1000, 1000 g of caprolactam, and 2 g of phosphoric acid were charged in a 3 liter stainless reactor, under purge of nitrogen gas. The reaction mixture was heated to 240° C. and stirred for 1.5 hours. In the second step, 146 g of adipic acid and 3 g of antioxidant were introduced into the reactor, the reaction temperature was raised slowly from 240° to 260° C., and held at 260° C.; a 1 to 2 mmHg vacuum was then applied for 3 hours. The electric current of the stirring motor increased significantly when the molecular weight increased, and for a suitable range of electric current, the product was discharged under a melt condition. The relative viscosity and melting point of the product were measured. A portion of the product was compression molded, a portion was injection molded, and the standard specimens obtained were then used to determine the mechanical properties.

EXAMPLES 2-4

The preparation process was identical to that described in Example 1, except 1500, 2300, and 660 g of caprolactam were added respectively for Examples 2, 3, and 4. The same tests were conducted to compare the influence of the various compositions.

EXAMPLE 5

Conditions identical to those described in Example 1 were employed, except that 500 g of PTMEG with a molecular weight of 2000, 500 g of caprolactam, 1 g of phosphoric acid, and 36.5 g of adipic acid were used. The same tests were conducted as in Example 1.

EXAMPLES 6-8

The preparation process was the same as described in Example 5, except that 750, 1160, and 330 g of caprolactam were added respectively for Examples 6, 7, and 8. The same tests were conducted to compare the influence of various compositions.

EXAMPLES 9, 10

The reactants and procedure were identical to those described in Example 1, except that 188 g of azelaic acid and 230 g of dodecanedioic acid were used for Examples 9 and 10, respectively. The same tests were also carried out as in Example 1.

EXAMPLE 11

1000 g of PTMEG with a molecular weight of 1000, 1000 g of caprolactam, 2 g of phosphoric acid, 146 g of adipic acid, and 3 g of antioxidant were charged to the reactor, under a purge of nitrogen gas. The reaction mixture was heated to 240° C. and held at that temperature for 2 hours. Then, the reaction temperature was raised slowly to 260° C., and a vacuum of 1 to 2 mmHg was applied. The electric current of the stirring motor was never increased even after 5 hours of reaction. Thus, the molecular weight of the product was very low. In addition, the product was both very brittle and opaque. This Example demonstrates the importance of miscibility among the various reactants.

The test results are tabulated in Table I.

TABLE I

The test results of the products of Examples 1–11.

| Example | Appearance | Relative viscosity | Tm (°C.) | Tensile strength (kgf/cm$^2$) | Elongation (%) | Shore D Hardness |
|---|---|---|---|---|---|---|
| 1 | Transparent | 1.81 | 190 | 294 | 750 | 50 |
| 2 | Transparent | 1.89 | 200 | 350 | 570 | 56 |
| 3 | Transparent | 1.83 | 204 | 410 | 463 | 60 |
| 4 | Transparent | 1.87 | 163 | 160 | 980 | 36 |
| 5 | Transparent | 1.58 | 208 | 204 | 498 | 50 |
| 6 | Transparent | 1.65 | 211 | 216 | 350 | 55 |
| 7 | Transparent | 1.69 | 214 | 220 | 185 | 65 |
| 8 | Transparent | 1.85 | 203 | 160 | 605 | 38 |
| 9 | Transparent | 1.79 | 187 | 300 | 800 | 48 |
| 10 | Transparent | 1.93 | 191 | 310 | 850 | 46 |
| 11 | Opaque | Very brittle product | | | | |

While the present invention has been disclosed in connection with the preferred embodiments thereof, it should be appreciated that there may be other embodiments of the present invention which fall within the spirit and scope of the present invention as defined by the appended claims.

What is claimed is:

1. A method of preparing block copolyether-esteramides comprising:
    a first step of forming an amino group-terminated prepolymer containing both a polyamide hard segment and a polyether soft segment, by reacting lactam with a polyether polyol in the presence of a catalyst; and
    a second step of condensation polymerizing said prepolymer with a dicarboxylic acid chain extender to form a block copolyether-esteramide.

2. The method of claim 1, wherein said catalyst is selected from the group consisting of oxalic acid, toluene sulfonic acid, phosphoric acid, sulfuric acid, and mixtures thereof.

3. The method of claim 1, wherein the amount of said catalyst is from 0.01 to 5 wt% based on the total weight of the reaction mixture.

4. The method of claim 3, wherein the amount of said catalyst is from 0.05 to 2 wt% based on the total weight of the reaction mixture.

5. The method of claim 1, wherein said polyol is selected from the group consisting of poly(tetramethylene ether) glycol, polypropylene glycol, polyethylene glycol, and the mixtures thereof.

6. The method of claim 1, wherein the molecular weight of said polyol is between 200 and 6000, and the proportion of polyol is from 85 to 5 wt% based on the weight of the polymer.

7. The method of claim 6, wherein the molecular weight of said polyol is between 600 and 3500, and the proportion of polyol is from 80 to 15 wt% based on the weight of the polymer.

8. The method of claim 1, wherein said lactam is selected from the group consisting of caprolactam, undecanolactam, dodecanolactam, and the mixtures thereof.

9. The method of claim 1, wherein the proportion of said lactam is from 15 to 95 wt% based on the total weight of the reaction mixture of said first step.

10. The method of claim 8, wherein the proportion of said lactam is from 20 to 85 wt% based on the total weight of the reaction mixture of said first step.

11. The method of claim 1, wherein said chain extender is a dicarboxylic acid selected from the group consisting of succinic acid, adipic acid, suberic acid, undecanedioic acid, dodecanedioic acid, 1,4-cyclohexanedicarboxylic acid, terephthalic acid, isophthalic acid, o-phthalic anhydride, 2-6, naphthalene dicarboxylic acid, and the mixtures thereof.

12. The preparation method of claim 1, wherein said chain extender is a carboxylic polyamide oligomer having a molecular weight of from 150 to 1500, and is selected from the group consisting of carboxylic nylon-6, nylon-6,6, nylon-6,9, nylon-6,10, nylon-11, nylon-6,12, nylon-12, and the mixtures thereof.

13. The method of claim 11, wherein said carboxylic polyamide oligomer has a molecular weight of from 400 to 800.

14. The method of claim 1, wherein the reaction temperature of said first step is between 190° C. and 250° C., and the reaction time of said first step is from 1 to 4 hours.

15. The method of claim 13, wherein the reaction temperature of said first step is between 210° C. and 240° C., and the reaction time of said first step is from 1.5 to 2 hours.

16. The method of claim 1, wherein the reaction temperature of said second step is between 240° C. and 280° C., the pressure is from 0.1 to 10 mmHg, and the reaction time is from 2 to 6 hours.

17. The method of claim 15, wherein the reaction temperature of said second step is between 250° C. and 270° C., the pressure is from 1 to 5 mmHg, and the reaction time is from 3 to 5 hours.

* * * * *